United States Patent
Watanabe

Patent Number: 5,880,565
Date of Patent: Mar. 9, 1999

[54] ACTUATOR CONTROLLER

[75] Inventor: Shinji Watanabe, Tokyo, Japan

[73] Assignee: Mitsubishi Denki Kabushiki Kaisha, Tokyo, Japan

[21] Appl. No.: 24,199

[22] Filed: Feb. 17, 1998

[30] Foreign Application Priority Data

Nov. 14, 1997 [JP] Japan ................................ 9-313696

[51] Int. Cl.$^6$ ........................................................ H02J 5/00
[52] U.S. Cl. .................................................. 318/139; 307/85
[58] Field of Search .......................... 318/139, 105–110, 318/440–442; 361/23, 33, 26, 92; 307/52–68, 85–87; 320/2–21, 29, 30, 48

[56] References Cited

U.S. PATENT DOCUMENTS

| 5,336,934 | 8/1994 | Toepfer et al. | 307/10.1 |
| 5,339,446 | 8/1994 | Yamasaki et al. | 395/750 |
| 5,608,304 | 3/1997 | Okumaura | 320/5 |
| 5,701,980 | 12/1997 | Lee | 307/66 |
| 5,717,307 | 2/1998 | Barkat et al. | 320/5 |

Primary Examiner—Jonathan Wysocki
Attorney, Agent, or Firm—Sughrue, Mion, Zinn, Macpeak & Seas, PLLC

[57] ABSTRACT

An actuator controller capable of preventing various inconveniences that stem when the operation positions of the actuator have not been learned. The actuator controller comprises a sensor 6 for detecting the operation position of an actuator 1, an actuator control means 17 for so executing the feedback control operation that the operation position comes to a target position, a means 18 for driving the actuator based upon a control quantity from the actuator control means, a battery 9 for feeding an electric power to the actuator control means, a means 11 for determining the attached/detached state of the battery, and a means 12 for storing a relationship between the operation position and the voltage signal as a learned value, wherein in said learned value storage means has been written, in advance at the time of shipping, a predetermined initial value outside a range of said learned values, and, when it is determined that the battery has been detached, said actuator control means determines said learned value storage means to be in an unlearned state when said data value exhibits said predetermined initial value.

8 Claims, 5 Drawing Sheets

ACTUATOR CONTROLLER

BACKGROUND OF THE INVENTION

1. Field of the Invention

The present invention relates to a device for highly accurately controlling an actuator such as a brushless motor that is used for a device for controlling the amount of the air intaken, for example, by an engine. More particularly, the invention relates to a device for controlling the actuator, which easily determines the unlearned state concerning the operation position of the actuator and prevents inconvenience such as erroneous control operation.

2. Prior Art

An automotive engine has, in general, been provided with various actuators that are controlled by feedback. For example, a throttle valve and a throttle actuator have been provided in the intake passage.

The throttle actuator of this type is made up of, for example, a brushless motor which, in a normal state, opens or closes the throttle valve depending upon the amount of operation of the accelerator pedal, in order to control the amount of the air intaken by the engine being interlocked to the accelerator work by a driver.

Besides, the actuator controller for electrically controlling the throttle valve is capable of controlling the throttle valve independently of the accelerator work by the driver, and can be adapted to a control device for running at a speed limit and for a traction control device.

The actuator controller (device for controlling the amount of the air intaken by the engine) of this type has been disclosed in, for example, Japanese Laid-Open Patent Publication (Kokai) No. 315641/1989. When a motor having a brush commutator is used, a hysteresis torque is produced by the rotor between the forward running and the reverse running being caused by a pushing force of the brush commutator, making it difficult to highly accurately control the position. Therefore, a brushless motor has been used.

Furthermore, Japanese Laid-Open Patent Publication (Kokai) No. 240070/1993 discloses an actuator controller in which a rotor of a brushless motor and a rotary shaft of a throttle valve are coupled together via a reduction gear in order to highly accurately control the throttle valve.

In this case, in order to change over a stator winding (hereinafter referred to as "phase") of the brushless motor, provision is made of a counter electromotive voltage detector for detecting a counter electromotive voltage generated in the phase and a current change-over detector, obviating the need of using a highly accurate and expensive revolution detector.

FIG. 5 is a diagram of constitution concretely illustrating major portions of a general actuator controller, e.g., illustrating a device for controlling a throttle actuator (brushless motor) for an automotive engine.

FIG. 6 is a plan view illustrating the constitution of magnetic poles of a motor which is the throttle actuator in FIG. 5, and illustrates a state where the throttle valve is fully closed (state where no current is supplied to the motor).

In FIGS. 5 and 6, the throttle actuator constituted by a brushless motor (hereinafter simply referred to as "actuator") 1 is constituted by a rotor 2 which is divided into four segments that are respectively magnetized in the axial direction, and a stator or a field winding 3 arranged being opposed to the rotor 2.

In FIG. 5, a rotary shaft of the rotor 2 is coupled to a rotary shaft 5a of a throttle valve 5 in an intake passage 4 communicated with an engine (not shown).

The rotary shaft 5a of the throttle valve 5 is provided with a throttle opening sensor (hereinafter simply referred to as "sensor") 6 for detecting the operation position of the throttle valve 5. The sensor 6 forms a throttle opening degree T consisting of a voltage signal to represent an operation position of the throttle valve 5.

The field winding 3 is constituted by three phase windings of a U-phase, a V-phase and a W-phase.

Furthermore, each phase is constituted by a pair of windings as represented by U1, U2, V1, V2, W1, W2 in FIG. 6.

The field winding 3 is excited by an actuator control means 7 and an actuator drive means 8 that are powered by a battery 9, and generates magnetic fluxes in the axial direction so as to be opposed to the magnetic poles of the rotor 2.

Based upon an accelerator opening degree A that represents the amount of the accelerator pedal (not shown) depressed by a driver and a throttle opening degree T fed back from the sensor 6, the actuator control means 7 which is made up of a microcomputer operates the amount (ratio for supplying a motor phase current depending upon a target throttle opening degree) for controlling the actuator 1, and outputs it as a PWM duty signal.

The actuator control means 7 receives vehicle data such as engine running speed, vehicle speed, water temperature, etc. from various sensors that are not shown. For example, the accelerator opening degree A is input as detection data from an accelerator opening degree sensor.

The actuator drive means 8 supplies a current to the field winding 3 of each of the phases depending upon the PWM duty signal from the actuator control means 7, whereby the rotor 2 is driven to open or close the throttle valve 5 thereby to control the amount of the air intaken by the engine.

The actuator drive means 8 includes a three-phase bridge circuit consisting of a group 8a of preceding-stage switching elements (power transistors), and groups 8b and 8c of final-stage switching elements (FETs), a current detector 8d for detecting a current i (see broken line) that flows into the field winding 3, and an overcurrent detector 8e.

The group 8a of preceding-stage switching elements drives the upstream side of the three-phase bridge circuit in response to the PWM duty signal, and the group 8c of switching elements drives the downstream side of the three-phase bridge circuit.

An output signal of the overcurrent detector 8e is input to the actuator control means 7 to turn off the PWM duty signal (actuator drive signal) when an overcurrent is detected to protect the device from an overcurrent.

The U-phase, V-phase and W-phase of the field winding 3 are connected between the battery and the ground via the groups 8b, 8c of final-stage switching elements.

Described below is the operation of the conventional actuator controller shown in FIGS. 5 and 6.

First, when no current is supplied to the field winding 3 of the actuator 1, the throttle valve is returned to a fully closed position by a return spring (not shown) as shown in FIG. 6. In this case, a positional relationship between the rotor 2 and the field winding 3 (stator) has been so set that a magnetic pole boundary line M1 of the rotor 2 is in agreement with a U-phase reference line M2 of the field winding 3.

When the actuator control means 7 determines a predetermined operation condition and forms a PWM duty signal corresponding to a target throttle opening degree which varies depending, for example, upon the accelerator opening degree A, the actuator drive means 8 excites the field winding 3 by flowing a current depending upon the target throttle opening degree, thereby to drive the rotor 2 and to open and close the throttle valve 5.

Thus, provision is made of a sensor for detecting the accelerator opening degree A and a sensor 6 for detecting the throttle opening degree T, the rotor 2 of the actuator 1 is coupled to the rotary shaft 5a of the throttle valve 5 supported in the intake passage 4, and the field winding 3 is excited based upon the operation data to drive the rotor 2, in order to control the amount of the air intaken by the engine.

However, the conventional device requires a current detector 8d for changing over the current-feeding phase of the actuator 1 resulting in an increase in the input I/F of the actuator control means 7. Therefore, the constitution becomes complex, bulky and drives up the cost. Moreover, when the current-feeding phase is changed over based upon the throttle opening degree T from the sensor 6, the position for changing over the current-feeding phase is deviated due to tolerance in the characteristics of the sensor 6.

In driving the brushless motor of the actuator 1, furthermore, the current suddenly changes when the current-feeding phase is changed over based upon the output of the counter electromotive voltage detector or the current change-over detector. Therefore, when the detector signal is deviated relative to a change in the magnetic flux applied to the phases, the torque produced by the actuator 1 becomes discrete and the throttle opening degree T suddenly changes.

To prevent such a sudden change, it can be contrived to employ a three-phase feeding system for feeding a current of a sinusoidal waveform to the U-, V- and W-phases independently of each other. This system, however, needs a detector for accurately measuring the rotational angle of the rotor 2, driving up the cost.

When the actuator 1, actuator control means 7 and actuator drive means 8 are combined together, furthermore, a device can be contrived in which the magnetic pole position of the rotor 2 is detected by the sensor 6 while stepwisely driving the actuator 1 according to a predetermined procedure in response to the on/off operation of a key switch (not shown), in order to store the magnetic pole positions of the rotor 2 as learned values.

In this case, the magnetic pole position of the rotor 2 is detected relying upon an output value of the sensor 6 when the actuator 1 is being normally driven and controlled at a moment when the key switch is turned on, and the learned value is found relying upon an interpolation operation, in order to control the current-feeding ratio for the phases of the field winding 3.

Even in the controller using a learned value of the operation position of the actuator 1, however, the actuator control means is not capable of determining whether the magnetic pole position of the rotor 2 has been learned or not. It is not, therefore, possible to determine whether the actuator control has been executed or not, or a trouble has been determined or not; i.e., there is a probability that the device is erroneously determined to be defective due to its own diagnosing function.

With the conventional actuator controller as described above, it is not possible to determine whether the operation positions of the actuator 1 have been learned or not even when learned values are used concerning the operation positions of the actuator 1, leaving a problem in that the device may be erroneously determined to be defective due to its own diagnosing function.

SUMMARY OF THE INVENTION

The present invention was accomplished in order to solve the above-mentioned problem, and its object is to provide an actuator controller capable of determining that a means for storing learned values of the operation positions of the actuator is in an unlearned state, in order to prevent various inconveniences that stem from the unlearned state.

An actuator controller according to the present invention comprises a sensor for detecting the operation position of an actuator relying upon a voltage signal, an actuator control means for so controlling the actuator by feedback that the operation position comes to a target position, an actuator drive means for driving the actuator based upon a control quantity from the actuator control means, a battery for feeding an electric power to the actuator control means, a battery attach/detach determining means interposed between the battery and the actuator control means to determine the attached/detached state of the battery, and a learned value storage means for storing a relationship between the operation position and the voltage signal as a learned value being controlled by the actuator control means, wherein in said learned value storage means has been written, in advance at the time of shipping, a predetermined initial value outside a range of said learned values, and said actuator control means includes an unlearned state determining means which, when said battery attach/detach determining means determines that the battery has been detached, makes a reference to a data value in said learned value storage means and determines said learned value storage means to be in an unlearned state when said data value exhibits said predetermined initial value.

The unlearned state determining means in the actuator controller according to the present invention makes a reference to a data value in the learned value storage means in response to the connection of the battery to the actuator control means.

The actuator control means in the actuator controller of the present invention includes a control inhibition means for inhibiting the control operation for said actuator when said unlearned state determining means has determined the unlearned state.

Furthermore, the actuator control means in the actuator controller of the present invention includes a trouble determining means for determining a trouble in the actuator based upon the operation position, and a trouble determination inhibition means for invalidating the trouble determining means when the unlearned state determining means has determined the unlearned state.

Moreover, the actuator control means in the actuator controller of the present invention writes a learned value into the learned value storage means in response to the break of the battery circuit.

The learned value storage means in the actuator controller of the present invention is constituted by an EEPROM.

The actuator to which the actuator controller of the invention is adapted is constituted by a brushless motor which includes a three-phase field winding and a rotor.

Furthermore, the actuator controller of the present invention controls a throttle actuator of an engine mounted on a vehicle.

DESCRIPTION OF THE PREFERRED EMBODIMENTS

Embodiment 1

An embodiment 1 of the present invention will now be described with reference to the drawings.

Figure 1:
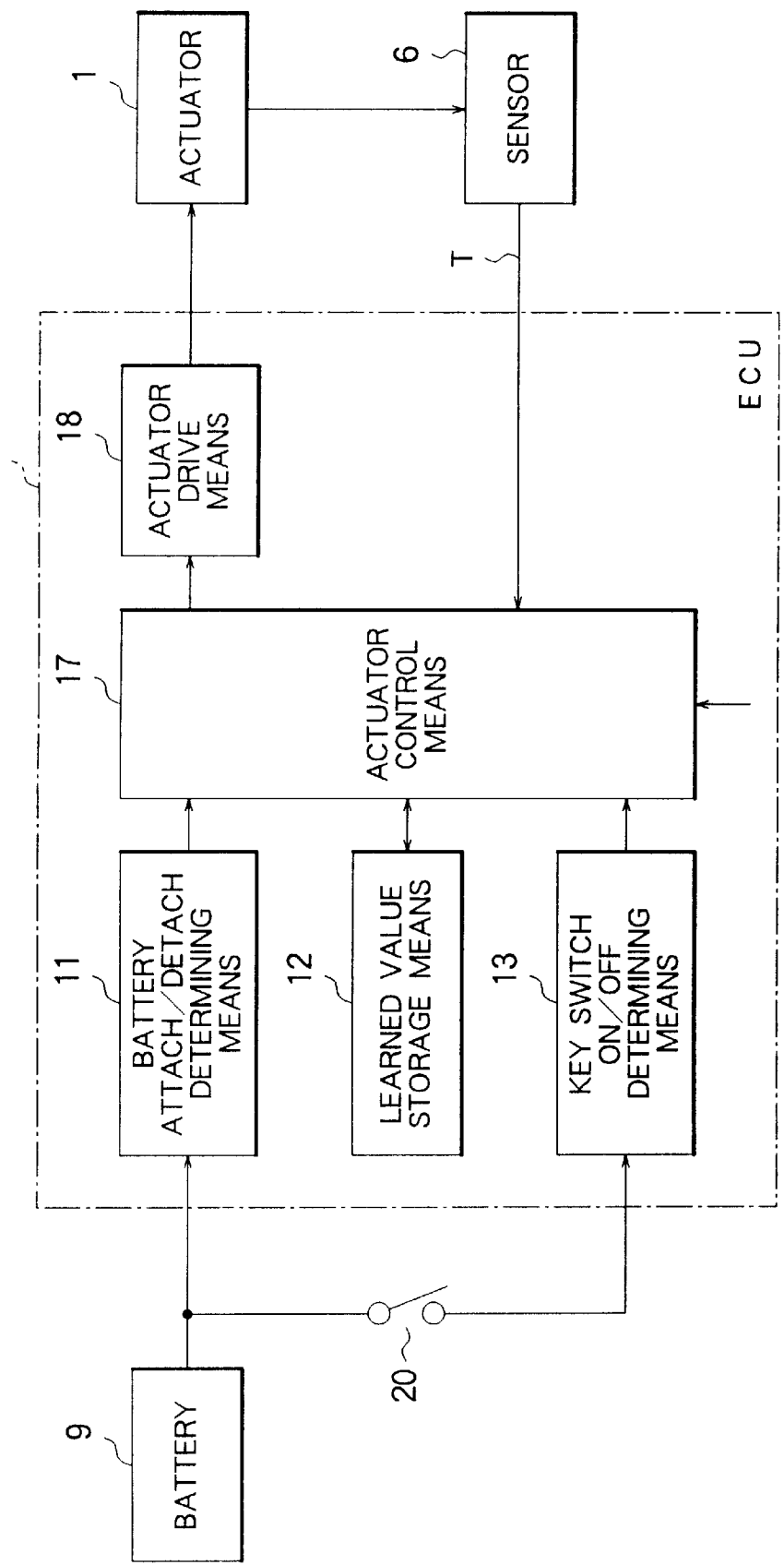
FIG. 1 is a block diagram illustrating an embodiment 1 of the present invention.

FIG. 1 is a block diagram illustrating an embodiment 1 of the present invention, wherein the same elements as those mentioned above are denoted by the same reference numerals but their description is not repeated.

An actuator control means 17 and an actuator drive means 18 correspond to the above-mentioned actuator control means 7 and the actuator drive means 8, respectively, and are constituted in an electronic control unit (hereinafter referred to as "ECU") 10.

Figure 5:
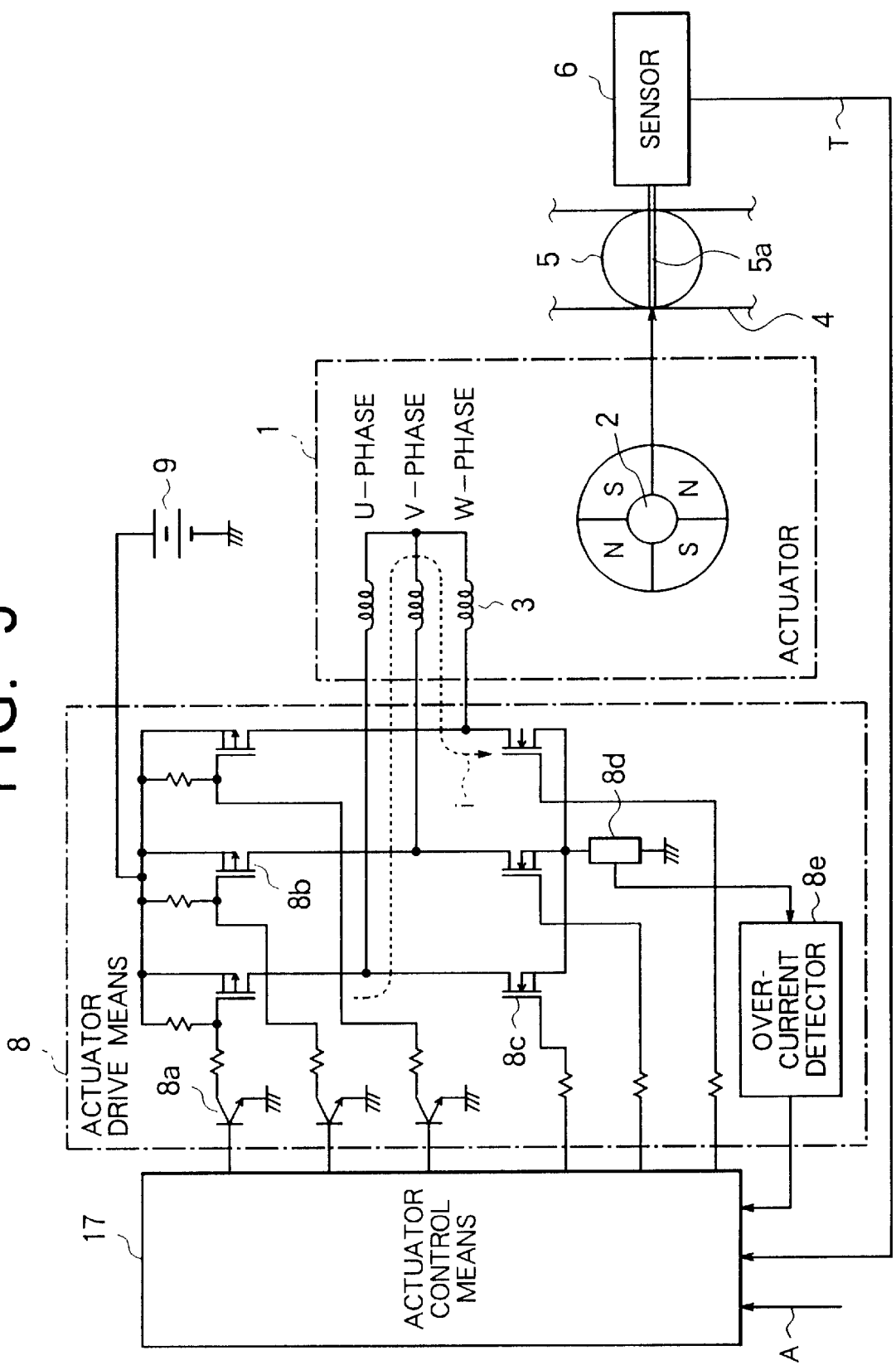
FIG. 5 is a diagram of constitution illustrating major portions of a conventional actuator controller.

An actuator 1, in this case, is constituted by a brushless motor that includes the rotor 2 and the three-phase field winding 3 like the one described above (see FIG. 5), and works as a throttle actuator for an engine mounted on a vehicle. Therefore, a key switch 20 is provided between a battery 9 and an ECU 10.

Being related to the actuator control means 17, the ECU 10 is equipped with a battery attach/detach determining means 11, a learned value storage means 12, and a key switch on/off determining means 13.

The battery attach/detach determining means 11 is inserted between the battery 9 and the actuator control means 17 to determine the attached or detached state of the battery 9.

The learned value storage means 12 comprises, for example, an EEPROM, and stores, as a learned value, a relationship between the operation position of the actuator 1 and the throttle opening degree (voltage signal) T being controlled by the actuator control means 17.

The key switch on/off determining means 13 is inserted between the key switch 20 and the actuator control means 17, and determines the on or off state of the key switch 20 (closure of the battery circuit 9).

Figure 2:
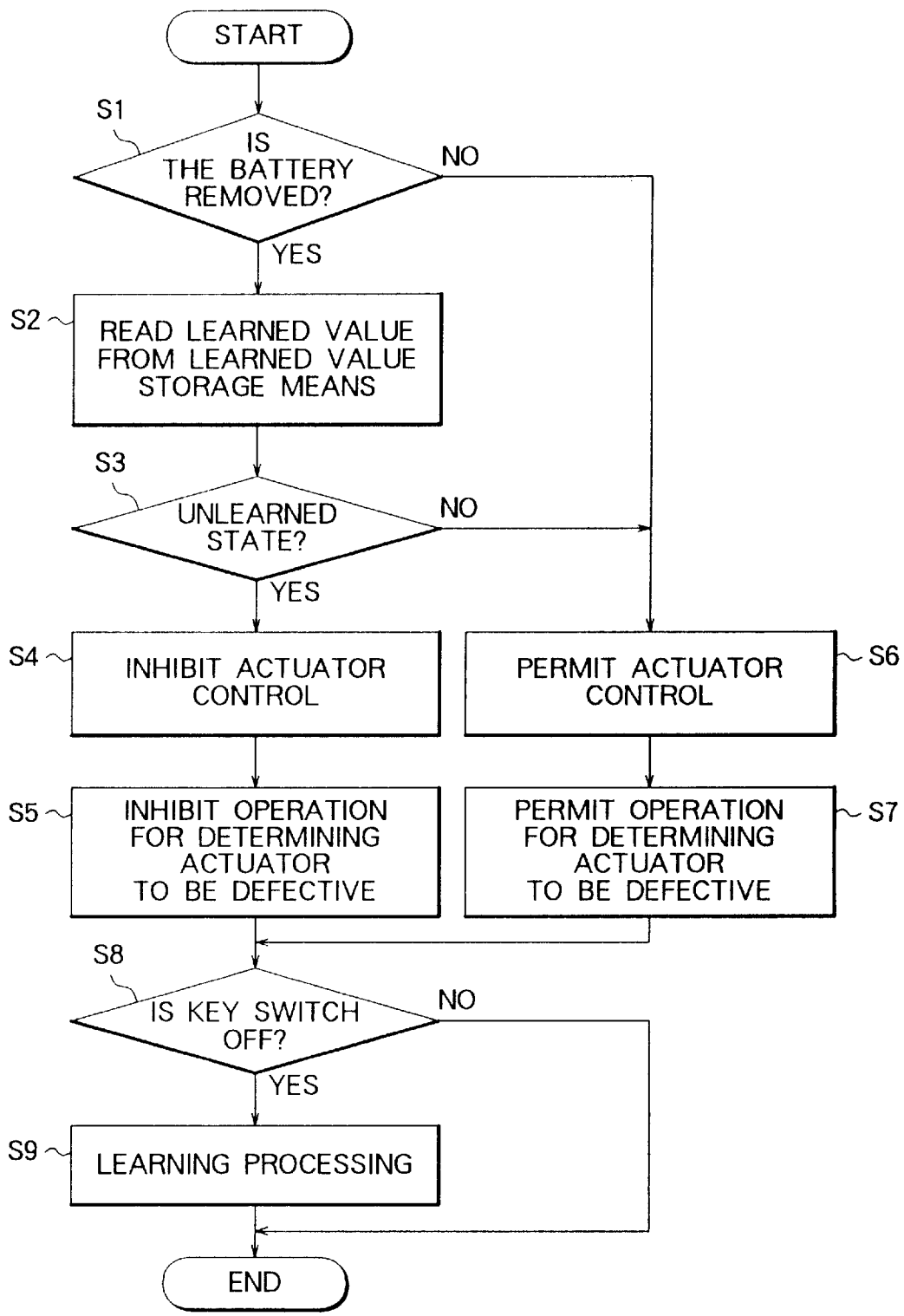
FIG. 2 is a flow chart illustrating the operation according to the embodiment 1 of the present invention.

Operation of the embodiment 1 of the invention shown in FIG. 1 will now be described with reference to a flow chart of FIG. 2.

At the time of shipping, a predetermined initial value outside the range of the learned values has been written in advance in the learned value storage means (EEPROM) 12. Furthermore, the predetermined initial value of the learned value storage means 12 has been stored in the ROM in the actuator control means 17.

The predetermined initial value comprises a data pattern outside the range of the learned values, and in which data values of neighboring plural bits are set alternatingly and repetitively like "0, 1, 0, 1, ---".

First, when the key switch 20 is turned on to close the battery circuit 9, the actuator control means 17 makes a reference to the battery attach/detach determining means 11 to determine whether the battery 9 is removed or not (step S1).

When the battery 9 has been removed, the battery attach/detach determining means 11 sends a signal representing the removal of battery to the actuator control means 17.

Usually, even when the key switch 20 is turned off and the operation program of the actuator control means 17 is halted, the data value in the RAM of the actuator control means 17 are held owing to a back-up power source (not shown) unless the battery 9 is removed.

When the battery 9 is removed, however, the back-up power source is no longer supported, and the data value in the RAM of the actuator control means 17 are cleared.

Therefore, when it is determined at the step S1 that the battery 9 is removed (i.e., YES), the actuator control means 17 tries to fetch learned values related to the operation positions of the actuator 1 from the data value in the learned value storage means 12, since the RAM data in the actuator control means 17 have been cleared.

That is, when the battery attach/detach determining means 11 determines that the battery 9 has been removed, the actuator control means 17 reads the data value in the learned value storage means 12 (step S2) and determines whether the data value is a predetermined initial value (unlearned state) or not (step S3) in order to make sure if the learned values have been written already in the learned value storage means 12.

When the data value read out from the learned value storage means 12 is in agreement with the predetermined initial value and, hence, when it is determined that the learned value storage means 12 is in the unlearned state (i.e., YES), the actuator control means 17 inhibits the operation for controlling the actuator 1 until the learning processing (mentioned later) is finished (step S4).

When there is provided a trouble determining means for determining a trouble in the actuator 1 based on the operation position (opening-degree voltage) of the actuator 1, the actuator control means 17 invalidates the trouble determining means and inhibits the operation for determining the actuator 1 to be defective (step S5).

When it is determined at the step S1 that the battery 9 has not been removed (i.e., NO) or when it is determined at the step S3 that the learned value storage means is in the unlearned state (i.e., NO), then, the operation for controlling the actuator 1 is permitted (step S6).

When there is provided a means for determining the trouble of the actuator 1, the actuator control means 17 validates the trouble determining means to permit the operation for determining the actuator 1 to be defective (step S7).

Thereafter, it is determined whether the key switch 20 is turned off or not (step S8). When it is determined that the key switch 20 is turned on (i.e., NO), the processing of FIG. 2 ends. When it is determined that the key switch 20 is turned off (i.e., YES), a learning processing is executed (step S9) and the processing of FIG. 2 ends.

Next, the operation of the learning processing (step S9) of FIG. 2 will be concretely described with reference to FIGS. 3 and 4.

Figure 3:
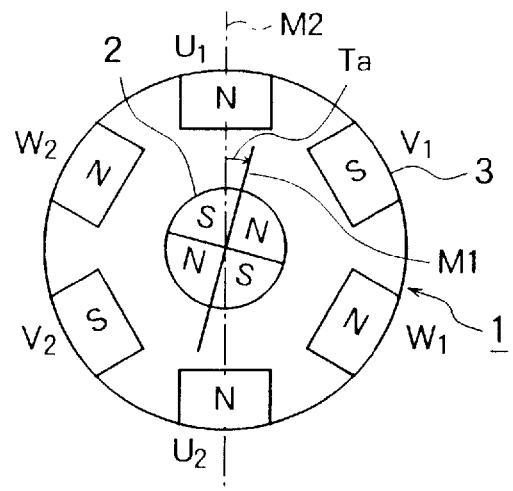
FIG. 3 is a plan view illustrating the operation positions of an actuator during the learning processing according to the embodiment 1 of the present invention.

FIG. 3 is a plan view illustrating operation positions of the actuator 1 of FIG. 1, and shows a stepwise rotational angle Ta of the rotor 2 based upon the magnetic pole constitution of the rotor 2 and the current-feeding pattern (current-feeding pattern of the first time, here) of the field winding 3.

Figure 6:
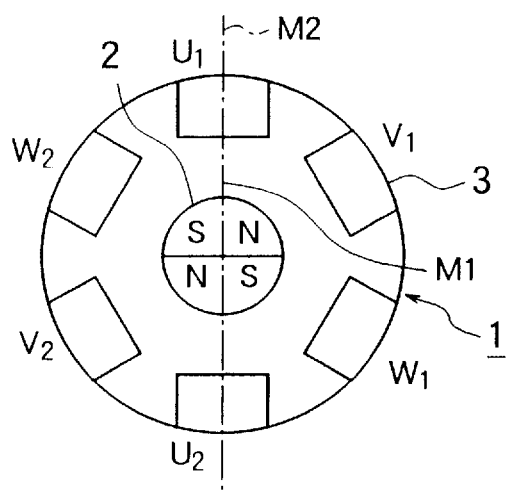
FIG. 6 is a plan view illustrating the constitution of magnetic poles of a general actuator.

When a current-feeding pattern of the first time is applied to the field winding 3 as shown in FIG. 3, the rotor 2 is stepwisely driven by an angle Ta from the non-powered state (fully closed position) of FIG. 6, and remains at this position.

Here, the rotational angle Ta is an angle subtended by the magnetic pole boundary line M1 of the rotor 2 with respect to the U-phase reference line M2 of the field winding 3, and the stepwise rotational angle Ta due to the current-feeding pattern of the first time is, for example, 15°.

Figure 4:
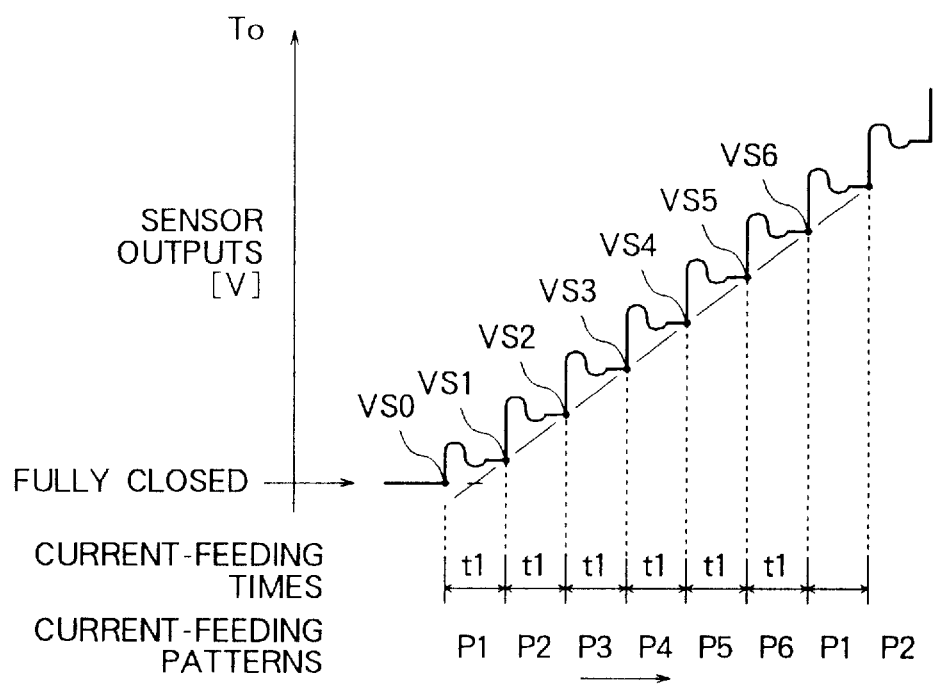
FIG. 4 is a diagram illustrating learned values according to the embodiment 1 of the present invention.

FIG. 4 is a diagram illustrating the sensor outputs (voltage signals) To corresponding to the stepwise drive of the rotor 2, and shows voltages VS0 to VS6 [V] corresponding to the throttle opening degrees (To) relative to the current-feeding patterns P1 to P6 for the actuator 1.

The voltage VS0 is a sensor output when no current is fed to the field winding 3, and the voltages VS1 to VS6 are sensor outputs based on the first to the sixth current-feeding patterns.

That is, when the current-feeding pattern is successively changed over following the stepwise drive of the first time shown in FIG. 3, there are obtained the output voltage patterns shown in FIG. 4. In the non-powered state in FIG. 4, the throttle valve 5 (see FIG. 5) is at the fully closed position, and the throttle opening-degree voltage is VS0.

When the key switch 20 is turned off and the engine running speed becomes 0, the key switch on/off determining means 13 determines that the key switch 20 is in the off state (YES at the step S8). In practice, however, the supply of current to the ECU 10 is interrupted after about 7 seconds have passed from the turn-off of the key switch 20.

Therefore, the actuator control means 17 executes the learning processing (step S9) within several seconds before the supply of current is really interrupted.

When the key switch 20 is turned off, the throttle opening-degree voltage from the sensor 6 is compared with a predetermined voltage (e.g., 0.7 V) that corresponds to the fully closed position. When the throttle opening-degree voltage is greater than the predetermined voltage, the target opening-degree voltage is set to a learned value of the fully-closed voltage, and the throttle valve 5 is returned back to the fully closed position relying upon the opening-degree feedback control operation.

Then, at a moment when the throttle opening-degree voltage has become smaller than the predetermined voltage, the PWM duty signal (drive signal) from the actuator control means 17 is turned off, and the throttle valve 5 is returned to the fully closed position being urged by the return spring.

Then, the opening-degree voltage VS0 from the sensor 6 is stored as a fully-closed learned value in a state where the throttle valve 5 stably remains at the fully closed position.

The state where the throttle valve 5 stably remains at the fully closed position is set after the passage of a predetermined period of time (e.g., 0.5 sec.) from a moment when a change in the opening-degree voltage from the sensor 6 has become smaller than 20 mV within a sampling period (about 15 millisec.).

After the fully closed position is learned, the magnetic pole positions of the rotor 2 are successively learned. When the learning of the fully closed position has not been completed, the program is inhibited from proceeding to the operation for learning the magnetic pole positions of the rotor 2.

After the voltage VS0 in the non-powered state of the actuator 1 is learned as described above, the field winding 3 is excited relying on the first current-feeding pattern P1 for only a predetermined period of current-feeding time t1 (see magnetic pole pattern of FIG. 3). Therefore, the rotor 2 is rotated by a step angle Ta (=15°) only.

After the operation of the throttle valve 5 is stabilized, in this case, the actuator control means 17 reads a voltage value VS1 at a throttle opening degree (=15°) input from the sensor 6 with the magnetic pole position at the first step position as a learned value.

That is, the learned value of the magnetic pole position of the rotor 2 corresponding to a step position of the first time is obtained at a position rotated by the angle Ta (=15°) from the fully closed position (To=VS0).

Mentioned above is the case where the stepwise rotational angle Ta of the first time is 15°. Even when any other angle is employed, the actuator control means 17 can correctly recognize the stepwise rotational angle Ta of the first time by adding an increment of the sensor output voltage VS1 at the stepwise rotational angle Ta of the first time to the sensor output voltage VS0 at the fully closed position that is mechanically positioned.

Hereinafter, the actuator control means 17 stepwisely drives the rotor 2 by a rotational angle of 30° according to current-feeding patterns P2 to P6 to position the rotor 2 at positions of voltages VS2 to VS6 corresponding to the throttle opening degrees, and successively reads the magnetic pole positions which are stepwise positions as learned values.

The current patterns of the phases based on the current-feeding patterns P1 to P6 have been stored in advance in the RAM in the actuator control means 17.

The thus obtained learned values (see FIG. 4) are stored not only in the RAM in the actuator control means 17 but also in the learned value storage means 12; i.e., the learned values are held in the learned value storage means 12 even after the battery 9 is removed.

In the subsequent operation, therefore, the step 3 determines that the values have been learned already (i.e., NO). Therefore, the processing for controlling the actuator 1 (step S6) and the processing for determining trouble (step S7) are normally executed.

Thus, the actuator 1 is highly accurately driven by the interpolation operation and the like operation based on the learned values.

Thus, the data values in the learned value storage means 12 are referred to (step S2) in response to the connection of the battery 9 to the actuator control means 17 and, when it is determined that the learned value storage means 12 is still in the unlearned state (step S3), the control operation for the actuator 1 is inhibited (step S4).

Therefore, even when the battery 9 is connected immediately after the fabrication of the learned value storage means 12 which is still in the unlearned state, the actuator 1 is not wastefully controlled before effective data are written into the learned value storage means 12. Therefore, over-current is not undesirably supplied to the actuator 1, and the electric power is not wastefully consumed.

When means is provided for determining a trouble of the actuator 1, furthermore, the actuator control means 17 inhibits the operation of the means for determining the trouble (step S5) when the learned value storage means 12 is determined to be still in the unlearned state. This makes it possible to prevent erroneous determination of trouble in the state where the learning value storage means 12 is still in the unlearned state.

Besides, the learning processing (step S9) is executed and the learned value is updated every time when the key switch 20 is turned off and the battery circuit 9 is broken. Therefore, a highly accurate control operation is maintained following a change in the actuator 1 with the passage of time.

The actuator 1 treated here is a throttle actuator for an engine for vehicles, that require a high accuracy at the time of control operation by feedback. Therefore, the throttle actuator that requires learning processing is effectively prevented from being erroneously controlled or from being erroneously determined to be defective in the unlearned state.

Furthermore, use of a brushless motor as the actuator 1 makes it possible to highly accurately control the rotational angular position.

Since an EEPROM is used as the learned value storage means 12, it is allowed to easily update and write data values such as learned values and predetermined initial values.

Embodiment 2

The above-mentioned embodiment 1 has dealt with the throttle actuator for an engine for vehicles comprising a brushless motor as the actuator 1. However, any other actuator may be treated provided it can be controlled by feedback based upon the learned values.

Though the EEPROM was used as the learned value storage means 12, it is allowable to use any other storage means.

What is claimed is:

1. An actuator controller comprising:

a sensor for detecting the operation position of an actuator relying upon a voltage signal;

an actuator control means for so controlling said actuator by feedback that the operation position comes to a target position;

an actuator drive means for driving said actuator based upon a control quantity from said actuator control means;

a battery for feeding an electric power to said actuator control means;

a battery attach/detach determining means interposed between said battery and said actuator control means to determine the attached/detached state of said battery; and a learned value storage means for storing a relationship between said operation position and said voltage signal as a learned value being controlled by said actuator control means;

wherein in said learned value storage means has been written, in advance at the time of shipping, a predetermined initial value outside a range of said learned values; and said actuator control means includes an unlearned state determining means which, when said battery attach/detach determining means determines that the battery has been detached, makes a reference to a data value in said learned value storage means and determines said learned value storage means to be in an unlearned state when said data value exhibits said predetermined initial value.

2. An actuator controller according to claim 1, wherein said unlearned state determining means makes a reference to a data value in said learned value storage means in response to the connection of said battery to said actuator control means.

3. An actuator controller according to claim 1, wherein said actuator control means includes a control inhibition means for inhibiting the control operation for said actuator when said unlearned state determining means has determined the unlearned state.

4. An actuator controller according to claim 1, wherein said actuator control means includes:

a trouble determining means for determining a trouble in said actuator based upon said operation position; and a trouble determination inhibition means for invalidating said trouble determining means when said unlearned state determining means has determined the unlearned state.

5. An actuator controller according to claim 1, wherein said actuator control means writes said learned value into said learned value storage means in response to the break of said battery circuit.

6. An actuator controller according to claim 1, wherein said learned value storage means is constituted by an EEPROM.

7. An actuator controller according to claim 1, wherein said actuator is constituted by a brushless motor which includes a three-phase field winding and a rotor.

8. An actuator controller according to claim 7, wherein said actuator controller is a throttle actuator of an engine mounted on a vehicle.

* * * * *